Nov. 6, 1934.　　　　C. E. HENRIOD　　　　1,979,742
POWER TRANSMISSION MECHANISM
Filed Jan. 9, 1934　　　5 Sheets-Sheet 1
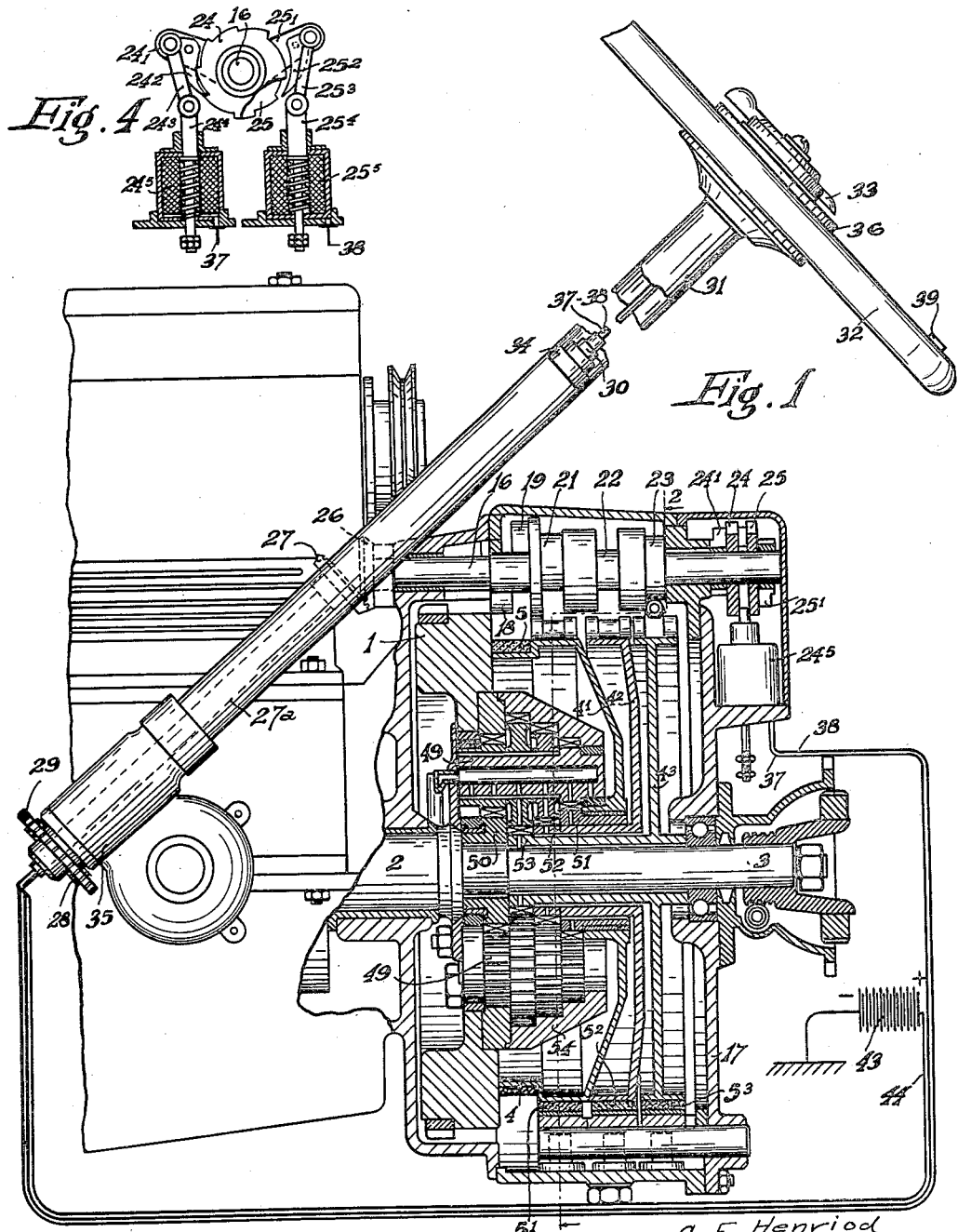

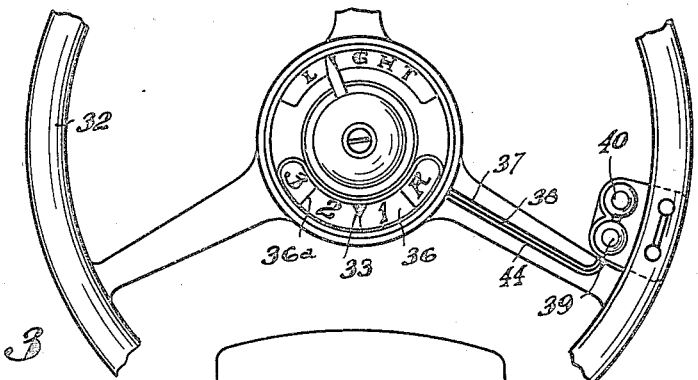
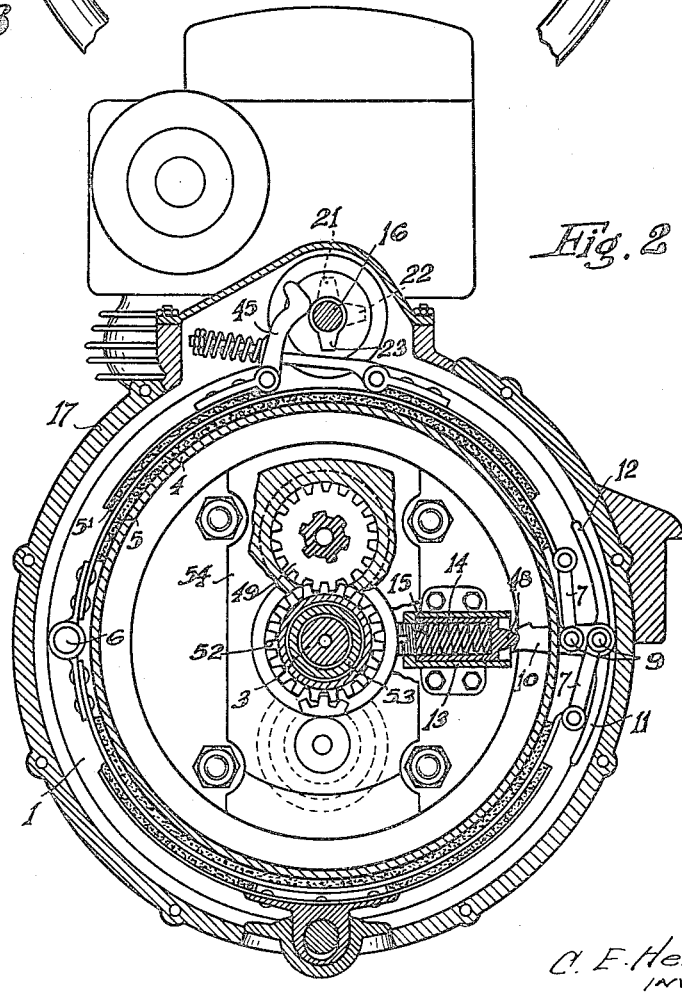

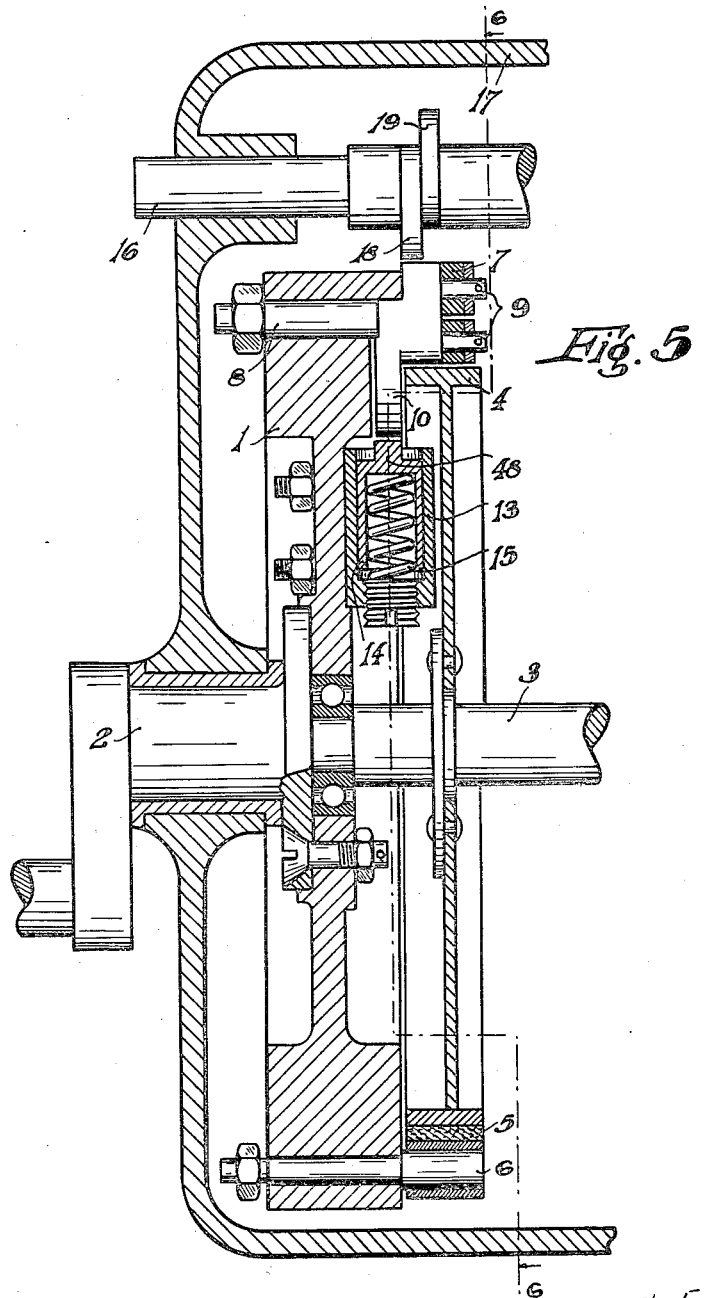

Nov. 6, 1934. C. E. HENRIOD 1,979,742
POWER TRANSMISSION MECHANISM
Filed Jan. 9, 1934 5 Sheets-Sheet 4

Nov. 6, 1934.  C. E. HENRIOD  1,979,742
POWER TRANSMISSION MECHANISM
Filed Jan. 9, 1934   5 Sheets-Sheet 5

C. E. Henriod
INVENTOR

By Marks & Clarke
ATT.

Patented Nov. 6, 1934

1,979,742

UNITED STATES PATENT OFFICE 1,979,742

POWER TRANSMISSION MECHANISM

Charles Edouard Henriod, Areuse, Switzerland

Application January 9, 1934, Serial No. 705,925
In France January 10, 1933

6 Claims. (Cl. 74—262)

This invention relates to power transmission mechanism and more particularly to change speed gears for motor vehicles, such as are made use of for imparting the movement of the main drive shaft to the secondary shaft and for varying the degree of speed of the secondary shaft. The invention relates particularly to mechanism in which is included a planetary system of gears the movement of which is controlled by drums and brake devices.

The main object of the invention is the provision of improved means for operating the brake devices and which renders the control of the change speed gear extremely simple and independent of the speed of the main drive shaft.

Another feature is the provision of novel means for obtaining a movement of the secondary shaft at what is known as direct drive in automobile gears.

These and other objects and advantages of the invention will more fully appear from the following specification, reference being had to the accompanying drawings, in which:

Figure 1 is a vertical axial section through a change speed gear for automobiles according to the invention.

Figure 2 is a transverse section taken on the line 2—2 of Fig. 1.

Figure 3 is a fragmentary plan view of the steering wheel of the automobile provided with a change speed gear according to the invention.

Figure 4 shows a detail of the control mechanism for the gear.

Figure 5 shows in axial section a device for obtaining direct drive between the main drive shaft and the secondary shaft.

Figure 6:
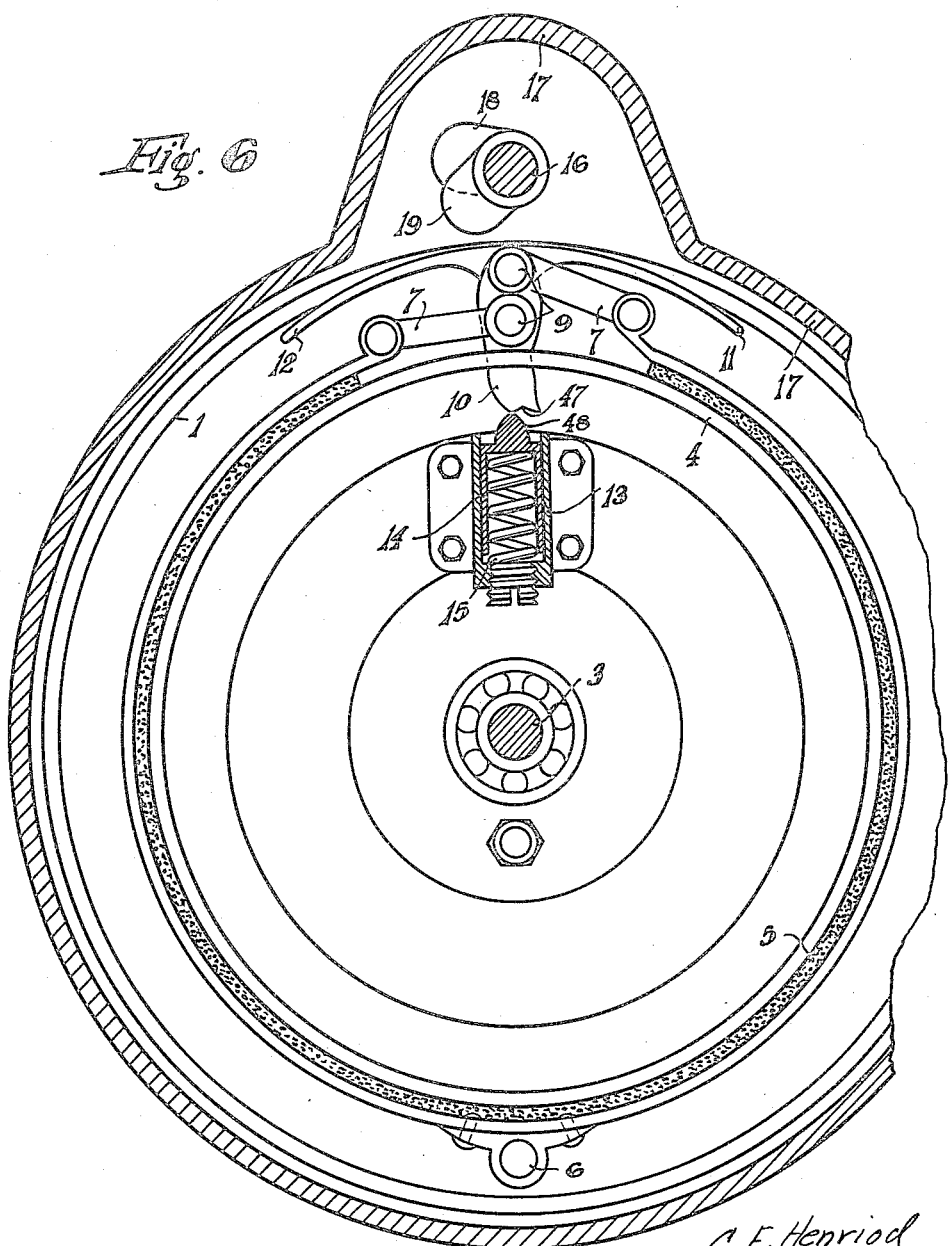
Figure 6 is a transverse section taken on the line 6—6 of Fig. 5.

In Figure 1, the crankshaft 2 of an automobile motor carries a flywheel 1 and transmits its movement to a secondary shaft 3 journaled with one end in the gear casing 17 and with the other end in a central recess provided in the end of the crankshaft. Transmission of movement between the two shafts is obtained by means of two planetary gears 49 comprising each four gear crowns and being loosely inserted between the flywheel and a member 54 screwed to the flywheel and provided with circular cavities of which the diameter corresponds to the diameter of the various gear crowns of each planetary gear. The two planetary gears are thus forced to turn with the flywheel 1.

Each planetary gear crown meshes with one central wheel mounted on the shaft 3. One central wheel 50 is keyed to the shaft 3 and the other central wheels 51, 52, 53 are loose on this shaft. The loose wheel 51 is rigidly connected to two brake drums 4 and $4^1$, and the other loose wheels are each provided with one brake drum $4^2$ and $4^3$, respectively. Each of the brake drums coacts with a brake band 5, $5^1$, $5^2$ and $5^3$, respectively.

The brake bands are operated by means of cams 18, 19, 21, 22 and 23 provided on a cam shaft 16 journalled in the gear case 17 and extending parallel to the shafts 2 and 3. The cams 18 and 19 act by means of a mechanism, which will be hereinafter described in detail, on the brake band 5 which, when applied to the drum 4, locks the central wheel 51 for rotation with the flywheel. The shaft 16 is operated by means of two ratchet devices of which the ratchet wheels 24 and 25 are fixed on the shaft and are provided with opposed ratchet teeth. Two levers $24^1$ and $25^1$ are freely turning on the shaft 16 and carry each a pawl $24^2$ and $25^2$, respectively coacting with the corresponding ratchet wheels. To each pawl is articulated a link $24^3$ and $25^3$, respectively, for connecting the pawls and levers to suitable control mechanism which may be purely mechanical, pneumatic or hydraulic, or as represented in Fig. 1, this control mechanism may be electromagnetically operated. The links $24^3$ and $25^3$ are connected to rods $24^4$ and $25^4$, constituting movable cores of electromagnets $24^5$ and $25^5$. It would however also be possible to connect these rods to operating pedals to be moved by the foot of the driver instead of being controlled by electromagnets.

The shaft 16 carries a gear wheel 26 meshing with a wheel 27 on one end of a shaft 27a carrying on its other end a pinion 28 meshing with a wheel 29 carried by a tubular shaft 30 extending within the steering post 31 which carries the steering wheel 32. The shaft 30 carries an indicating member or needle 33 projecting above the hub of the steering wheel. This needle moves therefore in correspondence with the movements of the cam shaft 16 and can thus indicate the position of the shaft 16 or consequently the ratio of transmission between the crankshaft and the driven shaft. The gear train 26, 27, 28, 29 will have a slight reducing ratio so that the angle of rotation of the needle 33 is smaller than the angle of rotation of the shaft 16 which turns itself through less than one revolution. The shaft 30 is surrounded by a tube 34 secured to the casing 35 containing the steering gear. This fixed tube 34 carries at its upper end a dial 36 carrying indications relative to the transmission ratio of the change speed gear, such as "R" for reverse speed, "1", "2" and "3" for forward speeds, "3" indicating direct drive. This dial cooperates with the needle 33. The separation lines 36a between the speed indications on the dial indicate such positions of the cam shaft 16 in which none of the brakes of the central wheels is in active position and the crank shaft 2 is not connected to the driven shaft 3.

The circuit of the electromagnets $24^5$ and $25^5$ is controlled by interrupters 39 and 40 mounted on the rim of the steering wheel 32; these interrupters could also be placed on the dash board of the car.

The battery 43 has one of its terminals connected by means of the conductor 44 to each one contact member of the interrupters 39 and 40, while the second contact member of the interrupter 39 is connected by the conductor 37 to the electromagnet $24^5$ and the second contact member of the interrupter 40 is connected by the conductor 38 to the electromagnet $25^5$. The conductors 37, 38 and 44 pass through the interior of the steering post 31.

The ratchet wheels 24 and 25 have each a number of teeth such that each stroke of a core $24^4$ and $25^4$ causing a rotation of the ratchet through one tooth, corresponds to a movement of rotation of the cam shaft 16 which causes a change in the transmission of speed between the shafts 2 and 3 by operation of one or the other brake bands 5, $5^1$, $5^2$, or $5^3$.

Figure 10:
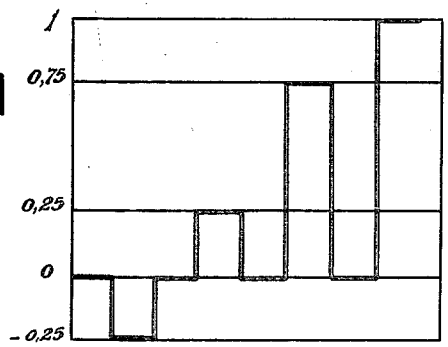
Figure 10 represents an explanatory graph illustrating the operation of the change speed gear.

The diagram of Figure 10 shows that when the change speed gear can give three forward speeds and one reverse speed, the number of teeth of the ratchets must be seven. In this diagram the speed ratio between the shafts 2 and 3 has been indicated by the ordinate and the rotation of the cam shaft by the abscissa. The stepped graph drawn in Fig. 10 expresses the fact that the cam shaft moves suddenly upon one of the electromagnets $24^5$ or $25^5$ being exited. It has been supposed that first and second speed is one fourth and three fourths, respectively of the speed of direct drive for which the speed ratio between the shafts 2 and 3 is equal to 1, and that the value of the reverse speed is —0.25.

It will be seen that the control mechanism for the brake bands must be such that a rotation of about one eighth of a turn of the cam shaft 16 causes a brake band to be applied to its drum. This can be easily obtained by the brakes represented in Figure 2 of which the operating levers 45 actuated by the cams of the cam shaft require only a small movement for tightening a brake band.

Figures 5 to 9 represent the means for obtaining direct drive. The flywheel 1 carries an arbor 8 provided on its end face with two eccentrically disposed pivot pins 9 carrying each a link 7. These links are each connected to one end of a brake band 5 which is secured to the flywheel 1 by the bolt 6 and turns therefore with the flywheel as also the links 7. The arbor 8 carries also three arms 10, 11, and 12. The end of the arm 10 cooperates with a hollow piston 14 slidably mounted in a sleeve 13 carried by the flywheel 1. A spring 15 urges the piston against the end of the arm 10. The arms 11 and 12 extend in opposite direction and such that according to the position of the arm 10 relative to the piston 14, one or the other of the arms 11 and 12 is upwardly directed (Figs. 7 and 8) to extend in proximity of the cam shaft 16. The two cams 18 and 19 on the shaft 16 are arranged to coact with the arms 11 and 12.

Figure 11:
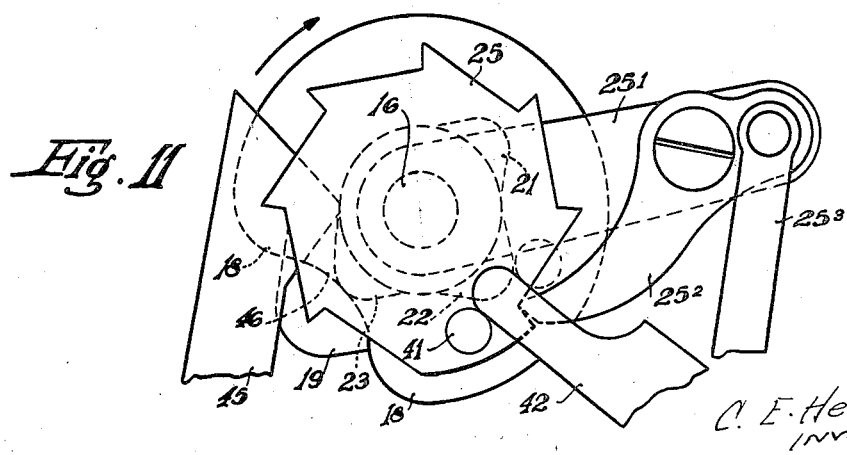
Figure 11 represents a detail of the control mechanism.

Figure 11 shows that the cam shaft has its movement of rotation limited in both directions by a pin 41 mounted on one of the ratchets and abutting against a stop 42 which may be carried by the gear casing. This pin 41 is disposed relative to the cams 18 and 19 so that the cam 19 arrives on the vertical through the center of the cam shaft when the pin abuts against the stop 42 on the upper side as shown in dotted lines. The cam 18 may be shaped to extend over substantially 270° of the cam shaft so as to present only a recess 46 which will arrive on the vertical during the last step of advance of the ratchet 25 when the cam 19 arrives on the vertical to replace the cam 18 in its action on the arbor 8.

The arm 10 of the arbor 8 has its free end provided with a notch 47 coacting with a projection 48 of the piston 14 which has as effect that the arm 10 turns for such an amount upon one of the arms 11 or 12 being depressed by one of the cams 18 or 19, that the other arm penetrates into the path of the other cam to be depressed in turn by this other cam.

The operation of the change speed gear will now be described. When the automobile, on which the gear is mounted, stops and the motor is running, the shaft 3 does not turn and the planetary member 49 meshing with the gear 50 on the shaft 3 turns about its own axis as also together with the flywheel 1 and imparts different speeds to the brake drums 4, $4^1$, $4^2$, $4^3$, the brake bands of which are all loose. The speed ratio between the shafts 2 and 3 is thus 0 (Fig. 10).

Figure 8:
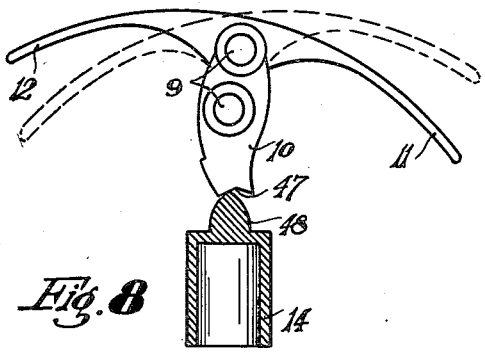
Figure 9:
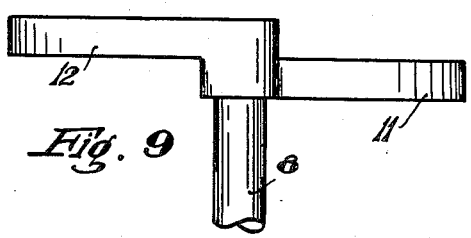
Figure 9 is a plan view of a member shown in elevation in Figures 7 and 8.

When all brakes are loose the arms 10, 11 and 12 are in the position shown in Fig. 8, the pins 9 being then so positioned that the links 7 open the brake band 5 (Fig. 6). The arm 11 has been depressed by the cam 18 while the arm 12 is ready to be acted upon by the cam 19. It is also to be supposed that the cam shaft 16 is in the position shown in Fig. 11, wherein the brake lever 45, operating the brake band $5^3$ of the drum $4^3$ connected to the central wheel 53 serving for reverse speed, is in proximity of the cam 23.

When now the button 40 on the steering wheel is pushed the electromagnet $25^5$ is exited and the core $25^4$ attracted so that the link $25^3$ will pull the arm $25^1$ and pawl $25^2$ downwards and turn the ratchet 25 and the cam shaft 16 through one step. The cam 23 then acts on the lever 45 and the brake $5^3$ is applied, locking the drum $4^3$ and the central pinion 53. The transmission ratio between this pinion, the planetary member and the fixed pinion 50 is such that a negative or reverse speed is imparted to the shaft 3, the speed ratio between the shafts 2 and 3 being for example —0.25 as indicated in the graph (Fig. 10).

When the button 40 is pushed a second time, the ratchet 25 is again actuated and the cam 23 passes the lever 45 which loosens the brake band $5^3$ and releases the pinion 53. No power is transmitted to the shaft 3 which turns according to the speed imparted to it by the moving car. This speed having no determined value, the speed ratio has been indicated as 0 in the graph of Fig. 10.

A third pressure on the button 40 brings the cam 22 into active position in the horizontal plane through the axis of the cam shaft. This cam 22 actuates the brake lever corresponding to the brake drum 4², so that this drum and the pinion 52 keyed to the hub of this drum is locked. First speed is thus obtained for which the speed ratio between the shafts 2 and 3 may be ¼ for example.

A fourth pressure on the button 40 makes the cam 22 pass its corresponding brake lever and again no power is transmitted to the shaft 3. A fifth pressure on the button 40 brings the cam 21 into active position which locks the wheel 51 against rotation. The shaft 3 turns now in second speed and the speed ratio between the shafts 2 and 3 is for example 0.75. A sixth pressure on the button again releases the shaft 3 from driving engagement with the shaft 2.

Finally a seventh pressure on the button brings the cam shaft 16 to the end of its stroke in which the cam 19 is situated on the vertical through the center of the cam shaft. This cam then acts on the lever 12 which is in the position shown in Fig. 8 and turns with the flywheel. The lever 12 is depressed and turns about its pivot 8 to the position shown in Fig. 7, in which the lever 11 is in the path of the cam 18. This movement of rotation of the lever 12 and the arm 10 results in a pulling action exerted by the pins 9 on the links 7 which tighten the brake band 5 around the drum 4.

As a matter of simplification the drum 4 has been shown in Figure 5 as being secured to the shaft 3. When the brake band 5 is tightened, the drum 4 and consequently the shaft 3 will therefore turn with the flywheel 1.

In Figure 1 the brake drum 4 is rigidly secured to the central wheel 51. When the brake band 5 is applied, this wheel 51 is forced to turn at the speed of the flywheel on which the brake is mounted and since the planetary member 49 meshes with the wheel 51 and also rotates together with the flywheel, this planetary member cannot turn about its own axis and acts therefore as clutch with respect to the pinion 50, by driving this pinion and thus the shaft 3 at the speed of the flywheel. In this manner direct drive is obtained.

During the operation of the change speed gear, the needle 33 on the hub of the steering wheel and which is operatively connected with the cam shaft 16 by the wheels 26, 27, shaft 27a, wheels 28, 29 and shaft 30, follows the movements of the cam shaft and indicates to the eye of the driver at what speed the gear is working. A further push on the button 40, once direct drive has been obtained, does not do any harm, since the pin 41 of one of the ratchets abuts then against the stop 42 and the cam shaft cannot turn further.

In order to change the speed backwards from direct drive, the button 39 will be pushed which controls the electromagnet 24⁵, the core 24⁴ of which operates the ratchet 24 to turn the cam shaft 16 in a direction opposite to that explained with reference to Fig. 11.

Figure 7:
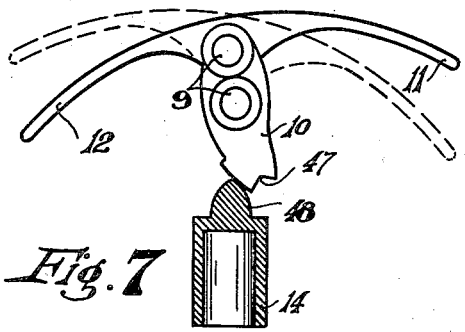
Figures 7 and 8 show a detail part of the direct drive device in two different working positions.

Upon the first step of rotation in reversed direction of the cam shaft 16, the cam 18 acts on the arm 11 which the cam 19 had previously brought to the position shown in Fig. 7, and returns the arms 10, 11 and 12 to the position shown in Fig. 8. Since the arm 10 is maintained in this position by engagement of the projection 48 in the notch 47, the cam 18 may have the shape of a simple boss as shown in Fig. 6. This cam can however have the shape represented in Figure 11 where it extends over 270° of the periphery of the cam shaft, so that if by any reason the piston 14 would disengage from the arm 10, the cam 18 would cause again the engagement of these two members as soon as the arm 11 passes the cam.

Once the arm 11 is in the position shown in Fig. 8, the successive actuation of the button 39 produces the same speed ratios between the shafts 2 and 3 as described before but in inversed order.

It will be understood that at any moment one can pass from the rotation of the cam shaft in one direction to rotation of the cam shaft in the other direction by pushing one or the other button 39 or 40, according as it is desired to decrease or increase the speed ratio. It is also seen that a single pressure on one of the buttons 39 or 40 is sufficient to release the shaft 3 from driving engagement with the shaft 2. All the functions in operating the change speed gear are positive and do not depend on the speed of the motor, but can be performed even at the highest speed of the motor shaft.

The device for obtaining direct drive has been represented by way of example only and provides the advantage that it acts as servomotor, since the energy required for throwing in the direct drive clutch is derived from the motor shaft 2 and not from the cam shaft which is only used to bring a cam into the path of the arms 11 and 12.

The invention is also not limited to the particular type of change speed gear represented in the drawings; other combinations of wheels could be used for transmission of power from the motor shaft to the driven shaft.

I claim:—

1. A power transmission for vehicles comprising a main drive shaft, a secondary shaft to be actuated thereby, means for varying the speed ratio between the two shafts, a rotatable cam shaft for controlling said means, indicating means situated in the range of vision of the vehicle operator and operatively connected to the cam shaft to be moved in accordance with the movements of the cam shaft, two stepping devices for moving the cam shaft in a step by step movement in both directions of rotation, an operating member for each stepping device and means for operatively connecting each operating member to the corresponding stepping device and adapted to move the cam shaft through one step each time the operating member is actuated.

2. A power transmission for motor driven vehicles comprising a main drive shaft, a secondary shaft to be actuated thereby, means for varying the speed ratio between the two shafts, a rotatable cam shaft for controlling said means, indicating means situated in the range of vision of the vehicle driver and operatively connected to the cam shaft to be moved in accordance with the movements of the cam shaft, two stepping devices operatively connected to the cam shaft for imparting a step by step movement in both directions of rotation to the cam shaft, an electromagnet associated with each stepping mechanism, and a switch included in the circuit of each electromagnet whereby the cam shaft will be moved through one step each time one of said switches is closed.

3. A power transmission for motor driven vehicles comprising a main drive shaft, a secondary shaft to be actuated thereby, gear wheels on the two shafts for connecting the shafts at different speed ratios, brake mechanisms associated with the wheels on one of the shafts and capable of holding said wheels in a stationary position, a rotatable cam shaft provided with cams for actuating said brake mechanisms, two stepping devices for actuating the cam shaft in a step by step movement in both directions of rotation, one of said stepping devices being operative to actuate the cam shaft in a direction corresponding to a decrease of speed ratio between the two shafts, and the other stepping device being operative to actuate the cam shaft in a direction corresponding to an increase in speed ratio between the two shafts, whereby a movement of the cam shaft through one step in either direction will cause one of the cams to be brought to active position for holding one of said wheels in stationary position and imparting a speed to the secondary shaft, and a movement of the cam shaft through a second step will disengage said wheel and cause the release of the secondary shaft from driving engagement with the main drive shaft.

4. A power transmission comprising a main drive shaft, a secondary shaft to be actuated thereby, a brake drum connected to the secondary shaft, a brake band mounted for rotation with the main drive shaft and adapted to coact with said drum, a lever pivoted on the main drive shaft and operatively connected to said brake band, said lever being adapted to alternately occupy two positions for applying or releasing the brake band, means for yieldingly holding the lever in either position, a rotatable cam shaft provided with two cams, and means on said lever for cooperation with said cams whereby said lever is moved into one position upon one of the cams being active and in the other position upon the other cam being active.

5. A power transmission comprising a main drive shaft, a secondary shaft to be actuated thereby, a planetary gearing connection between said shafts including planet gears driven by the drive shaft and sun gears meshing with the planet gears, brake mechanism for selectively holding said sun wheels stationary for driving said secondary shaft through said gearing, a rotatable cam shaft including cams for operating said braking mechanism, two stepping devices operatively connected to the cam shaft for rotation of the cam shaft in a step by step movement in both directions of rotation, and means for limiting rotation of the cam shaft to less than one revolution, said cams being disposed relative to the stepping devices that movement of the cam shaft through one step in either direction causes locking of one sun wheel for driving the secondary shaft at one speed, movement of the cam shaft through a second step causes the release of said sun wheel and of the secondary shaft and movement of the cam shaft through a third step causes locking of a second sun wheel for driving the secondary shaft at a second speed.

6. Operating mechanism for a cam shaft in an automobile transmission, comprising two stepping devices including each a ratchet wheel fixed to the cam shaft, a pawl for each ratchet wheel, said pawls being rotatably mounted on the cam shaft, two electromagnets for operating the stepping devices and including each an armature connected to one pawl, one of the stepping devices being operative for rotation of the cam shaft in one direction and the other stepping device being operative for rotation of the cam shaft in the other direction, a switch included in the circuit of each electromagnet and mounted on the steering wheel of the automobile, an indicator disposed in the range of vision of the automobile driver, and means for operatively connecting said indicator to the cam shaft whereby the indicator will move in correspondence with the movements of the cam shaft.

CHARLES EDOUARD HENRIOD.